United States Patent [19]

Malvern

[11] Patent Number: 5,098,188

[45] Date of Patent: Mar. 24, 1992

[54] METHOD AND APPARATUS FOR ELIMINATING KERR EFFECTS IN A RING GYRO

[75] Inventor: Alan Malvern, Berkshire, England

[73] Assignee: British Aerospace PLC, London, United Kingdom

[21] Appl. No.: 479,432

[22] Filed: Feb. 14, 1990

[30] Foreign Application Priority Data

Feb. 15, 1989 [GB] United Kingdom ............. 8903427

[51] Int. Cl.$^5$ ............................................. G01C 19/72
[52] U.S. Cl. ................................................. 356/350
[58] Field of Search ............. 356/350; 372/94, 33, 372/31

[56] References Cited

U.S. PATENT DOCUMENTS 4,825,261  4/1989  Schroeder ........................ 356/350

Primary Examiner—Vincent P. McGraw
Attorney, Agent, or Firm—Nixon & Vanderhye

[57] ABSTRACT

To overcome Kerr effect induced gyro bias in a ring resonator optical gyro, the intensities of the beams travelling in opposite directions around the ring have to be very accurately matched. To achieve this a ring resonator gyro includes a first optical coupler (6), the coupling ratio of which is variable and which divides light from a laser (1) into a first and a second component of generally equal intensity, a second optical coupler (8) which transmits a predetermined proportion of the first component to one input of the ring resonator (15) for transmission around the ring resonator (15) in one sense, and a third optical coupler (9), the coupling ratio of which is variable to couple a variable proportion of the second component to the other input of the ring resonator (15) for transmission around the ring resonator (15) in the opposite sense. The gyro also includes a detector (16) for sensing the intensity of light scattered from the optical ring resonator (15), a square wave generator (40) for periodically varying the coupling ratio of the first coupler (6), sample and hold circuits (45-48) responsive to the output of the detector (16) as the coupling ratio of the first coupler (6) is varied to sense the difference in intensity in the first and second components travelling around the ring (15), and second square wave generator (41) to vary the coupling ratio of the third optical coupler (9) and thus the intensity of the second component during alternate periods so that the time averaged intensity of both the first and second components are equal.

19 Claims, 5 Drawing Sheets

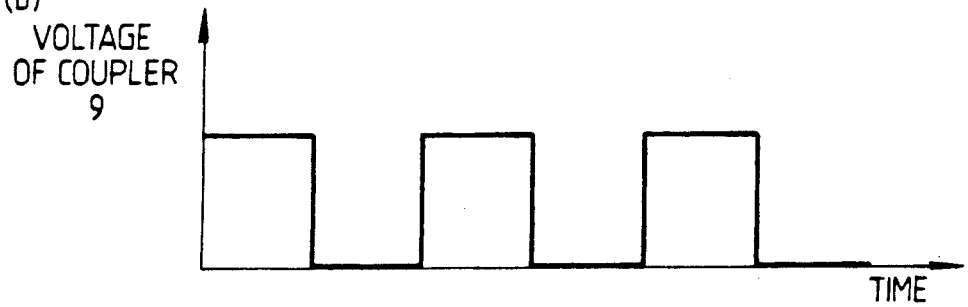
Fig.4.(b) VOLTAGE OF COUPLER 9
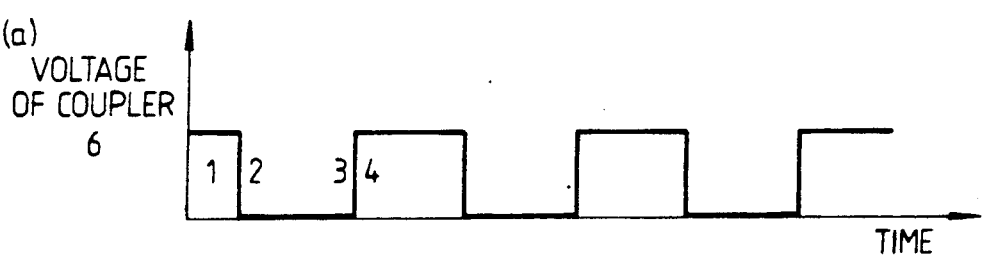
Fig.4.(a) VOLTAGE OF COUPLER 6
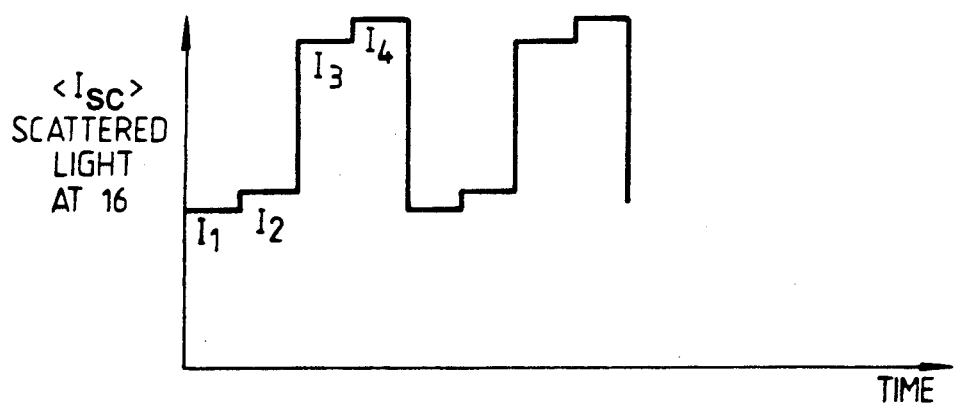
Fig.5.

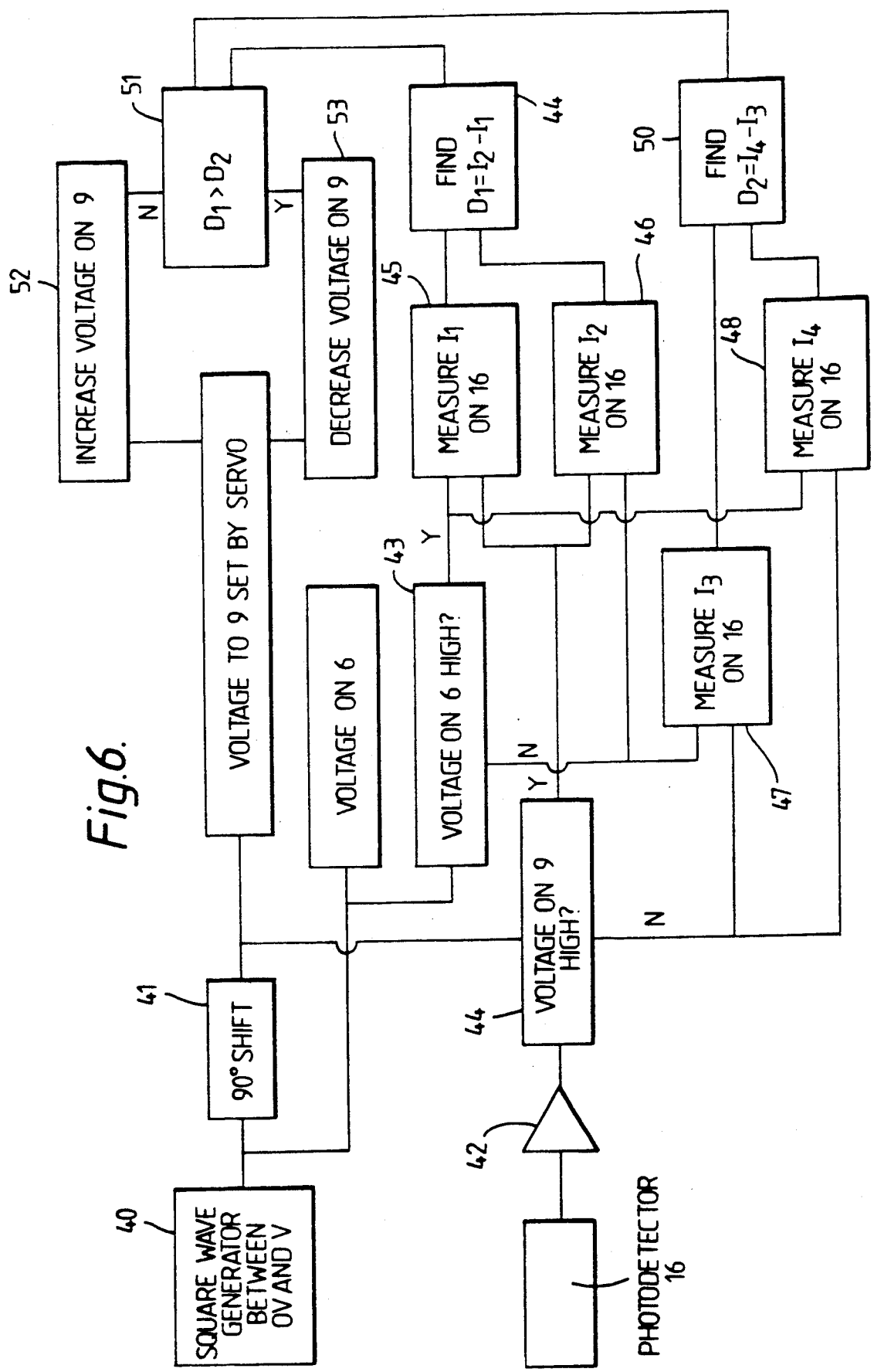

METHOD AND APPARATUS FOR ELIMINATING KERR EFFECTS IN A RING GYRO

BACKGROUND OF THE INVENTION

A ring resonator gyro typically has a laser which sends a continuous very high intensity beam of light in two opposite directions around an optical resonator ring, means for frequency shifting the laser light so that the light circulating in the ring is in resonance in both directions and means for deriving any angular rotation of the ring by monitoring the frequency difference between the light travelling in opposite directions.

As a result of the very high intensity light beam, non-linear effects in the resonator become significant in the operation of the gyro. One such non-linear effect is the Kerr effect which is caused by the refractive index of a material being dependent upon the intensity of light travelling through it. Thus, if there is a difference in intensity of light travelling in the two opposite directions around the ring resonator, then there will be a difference in optical path length due to the difference in the refractive index in the two directions. The refractive index differences may be represented as follows:

$$\Delta n_{cw} \propto I_{cw} + 2I_{ccw}$$

$$\Delta n_{ccw} \propto 2I_{cw} + I_{ccw}$$

where $I_{cw}$ and $I_{ccw}$ are the intensities of light in the clockwise and counter-clockwise beams respectively and $\Delta n_{cw}$ and $\Delta n_{ccw}$ are their corresponding refractive index differences. The optical path length difference causes a gyro bias which varies as a function of the relative intensity. To overcome the Kerr effect induced gyro bias, the intensities of the beams in the opposite directions have to be very accurately matched.

An acceptable upper limit for a gyro bias is 10°/Hr which would be caused by a 1 microwatt offset in the input power for the opposite directions. Since the power in the ring resonator gyro is generally 10–100 milliwatts, then the intensities would need to be matched to one part in $10^4$–$10^5$ to reduce the bias to match this limit. Equalisation of the intensities of the two beams to this degree of accuracy is very difficult to achieve in practice. For example, if samples of the beams travelling in the two directions are taken and compared directly, differences in the beam sampling arrangements and differences in the sensitivity of detectors used to monitor the two beams are likely to be much greater than the degree of accuracy required.

SUMMARY OF THE INVENTION

According to this invention, such a ring resonator gyro includes a first optical coupler, the coupling ratio of which is variable and which divides the light from the laser into a first and a second component of generally equal intensity, a second optical coupler which transmits a predetermined proportion of the first component to one input of the ring resonator for transmission around the ring resonator in one sense, a third optical coupler, the coupling ratio of which is variable to couple a variable proportion of the second component to the other input of the ring resonator for transmission around the ring resonator in the opposite sense, a detector for sensing the intensity of light scattered from the optical ring resonator, first varying means periodically to vary the coupling ratio of the first coupler, sensing means responsive to the output of the detector as the first varying means varies the coupling ratio of the first coupler to sense the difference in intensity in the first and second components travelling around the ring, and second varying means to vary the coupling ratio of the third optical coupler and thus the intensity of the second component during alternate periods so that the time averaged intensity of both the first and second components are equal.

By using a single detection and sensing means to detect the light scattered from the ring resonator at two different coupling ratios of the first coupler at two different times allows differences in the intensity of the light travelling in opposite senses around the ring to be determined with very high accuracy so that the time averaged intensity of the light in the two senses can be matched to the desirable accuracy of 1 part in $10^5$ and to enable Kerr effect induced gyro bias to be substantially eliminated.

The coupling ratio of the third optical coupler is preferably varied so that the intensity of the second component varies between a HIGH and LOW value at the same frequency as that of the first coupler. When the HIGH and LOW values have an equal duration the HIGH value of the intensity of the second component corresponds to the sum of the LOW value plus twice the difference between the intensity of the first component and the LOW value of the second component. Thus the magnitude of the intensity of the second component oscillates about and is centred on that of the first component so that, when time averaged, their intensities are the same.

Preferably the first and second varying means are separated by a phase difference of $\pi/2$ so that the sensing means senses in turn:

(a) the sum of the intensity of light scattered from the first and second components resulting from one coupling ratio of the first coupler and a LOW value of the second component (b) The sum of the intensity of light scattered from the first and second components resulting from another coupling ratio of the first coupler and the LOW value of the second component;

(c) the sum of the intensity of light scattered from the first components resulting from the other coupling ratio of the first coupler and a HIGH value of the second component; and, (d) the sum of the intensity of light scattered from the first and second components resulting from the one coupling ratio of the first coupler and the HIGH value of the second component.

Preferably the sensing means derives the differences between sensed values of (a) and (b) and between sensed values of (c) and (d) and varies the coupling ratio of the third optical coupler to make the two differences equal.

Preferably the second optical coupler has a coupling ratio such that the predetermined proportion of the first component for transmission to the one input of the ring is substantially one half of that output by the first optical coupler. The third optical coupler has a variable coupling ratio which is preferably variable such that the proportion of the second component for transmission to the other input of the ring can vary between 0 and 100% of that output by the first optical coupler.

The gyro typically includes means to shift the frequency of the laser light travelling in opposite senses around the ring resonator and these means are controlled to shift the frequency of the light so that that light travelling in both senses around the ring is in resonance. By monitoring a control signal applied to the frequency shifting means an indication of any angular rotation of the ring is obtained to provide the output for the gyro. Usually the control signals are monitored over repetitive sampling periods typically of around 1/100th of a second. In this case, it is preferred that there is an integral multiple of time periods of the oscillations of the coupling ratio of the first and third couplers in each sampling period so that the time averaged intensity of the light going around the ring in both senses over each sampling period is zero.

BRIEF DESCRIPTION OF THE DRAWINGS

A detailed example of a ring resonator gyro in accordance with this invention will now be described with reference to the accompanying drawings in which:

FIG. 4a is a graph showing the voltage applied to the first optical coupler;

FIG. 4b is a graph showing the voltage applied to the third optical coupler; and, FIG. 5 is a graph showing scattered light intensity as a function of time.

FIG. 6 is a block diagram schematically illustrating a logic circuit connected to the outputs of the photodetector and a square wave generator and arranged to carry out sampling and servo control functions.

DESCRIPTION OF PREFERRED EXAMPLE

Figure 1:
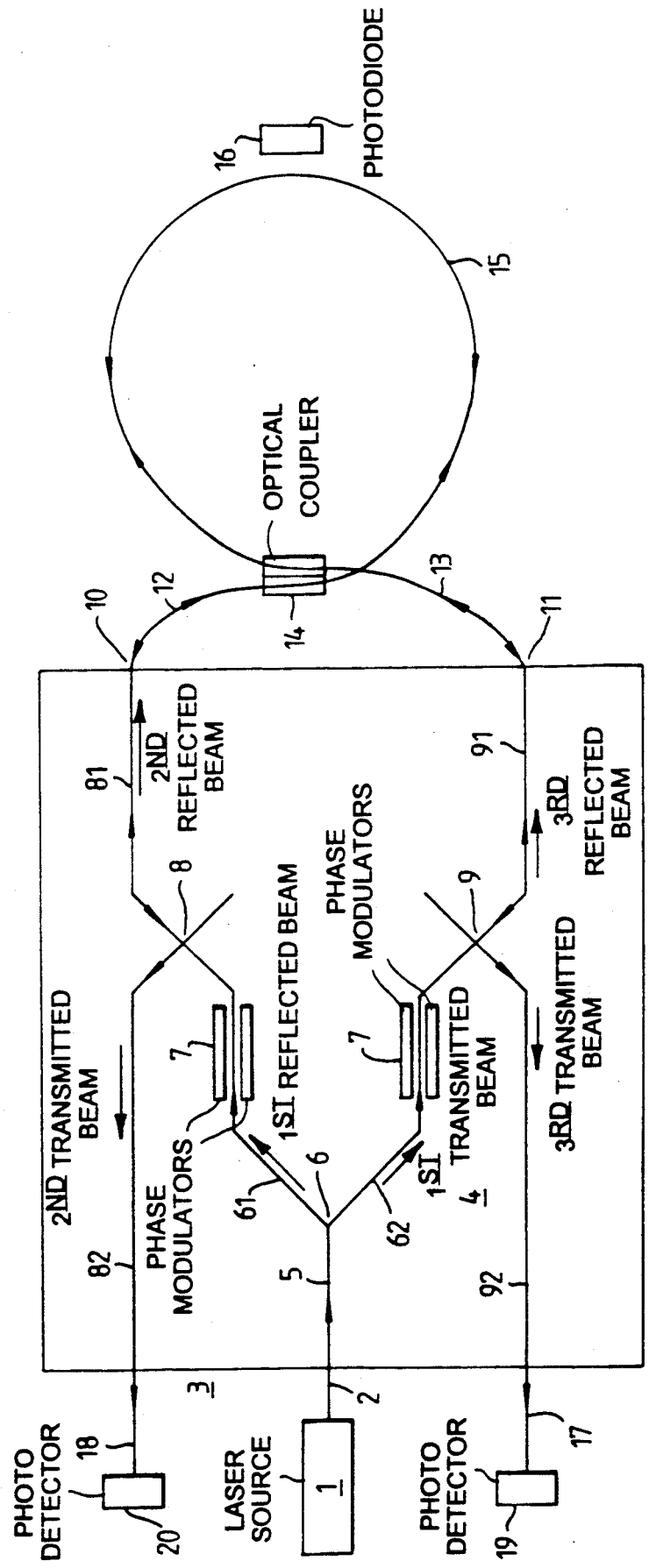
FIG. 1 is a schematic diagram of the example.

A narrow linewidth laser source 1 emits light for transmission via a single mode optical fibre 2 to an integrated optic circuit 3. Typically, the integrated optic circuit 3 is fabricated by titanium diffusion in lithium niobate and includes an input waveguide 5, a first optical coupler 6, phase modulators 7, a second optical coupler 8, and a third optical coupler 9, the first, second and third optical couplers 6,8 and 9 having electrically adjustable coupling ratios.

Light from the optical fibre 2 travels along the input waveguide 5 to the first optical coupler 6 where it is split into first reflected and first transmitted beams of generally equal intensity.

The first reflected beam passes along a waveguide 61 through the phase modulator 7 and to the second optical coupler 8 where it is split into a second reflected and a second transmitted beam. The second transmitted beam is dumped and the second reflected beam passes along a waveguide 81 and is transmitted via a single mode optical fibre 12 to a ring resonator 15. Similarly, the first transmitted beam passes along a waveguide 62 through the phase modulator 7 and is split at the third optical coupler 9 into a third reflected beam and a third transmitted beam, the third transmitted beam being dumped and the third reflected beam passing along a waveguide 91 for transmission via an optical fibre 13 to the ring resonator 15. The optical fibres 12 and 13 are coupled to the ring resonator 15 by a fourth optical coupler 14. The ring resonator is constructed from a single loop of optical fibre 15. The second and third reflected beams pass around the ring resonator in counterclockwise and clockwise directions respectively.

The majority of both beams continue to circulate around the ring 15 but a minor proportion are coupled via the fourth optical coupler 14 on each circuit to the optical fibres 12 and 13 and back to the integrated optics circuit 3. The counterclockwise beam returned along the waveguide 13 enters the integrated optics circuit 3 on waveguide 91, is transmitted through the optical coupler 9, passes along waveguide 92 and is transmitted from the circuit 3 via a single mode optical fibre 17. Similarly the clockwise beam returned along the waveguide 12 enters the integrated optics circuit 3, passes along waveguide 81, is transmitted through the optical coupler 8, passes along an output waveguide 82 and is transmitted from the circuit 3 via a single mode optical fibre 18 to a photodetector 20. Upon resonance, the amount of light leaving the ring resonator 15 via the coupler 14 and so detected by the photodetectors 19, 20 is a minimum. The photodetectors 19,20 are coupled to the phase modulators 7 to vary the frequency of the light travelling in opposite senses around the ring to maintain the amount of light leaving the ring via coupler 14 at a minimum so that resonance is maintained. Angular rotation of the ring 15 results in a change in the path length of both the clockwise and counter-clockwise beams and hence results in the frequency of both beams being shifted. Angular rotation detection circuitry (not shown) monitors the change frequency signals applied to the phase shifters 7 over a time period, typically one hundredth of a second and produces an output of angular rotation.

Figure 2:
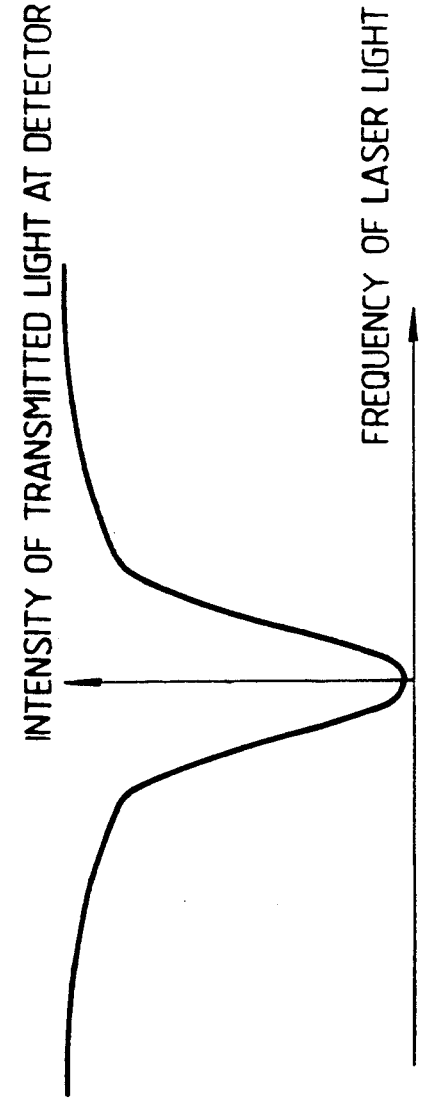
FIG. 2a is a graph showing how the intensity of light transmitted through the resonator varies as a function of frequency.
FIG. 2b is a graph showing how the intensity of scattered light varies as a function of frequency.
Figure 2:
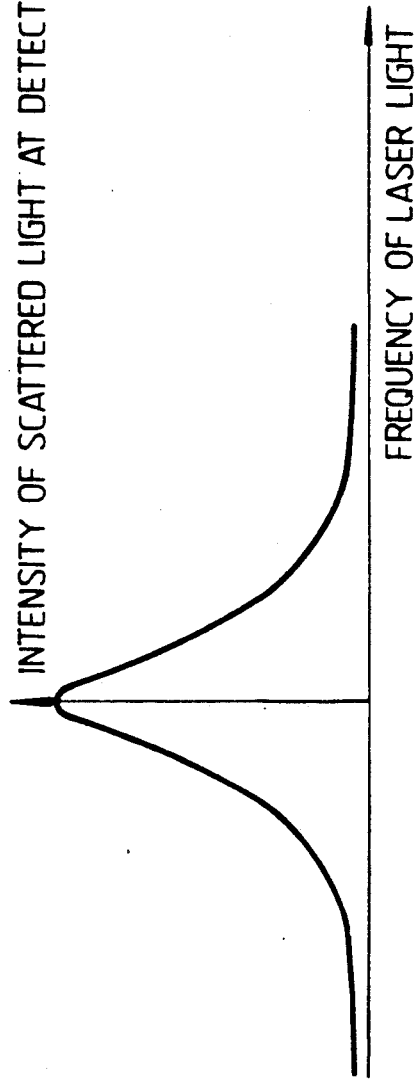

Upon resonance, as the light output is at a minimum there is an increase in the light scattered from the ring 15. FIG. 2 shows how the light output from the ring 15 decreases sharply on resonance and how there is a corresponding increase in the light scattered. A photodiode 16 is situated adjacent the optical fibre 15 and detects the scattered light.

Figure 3:
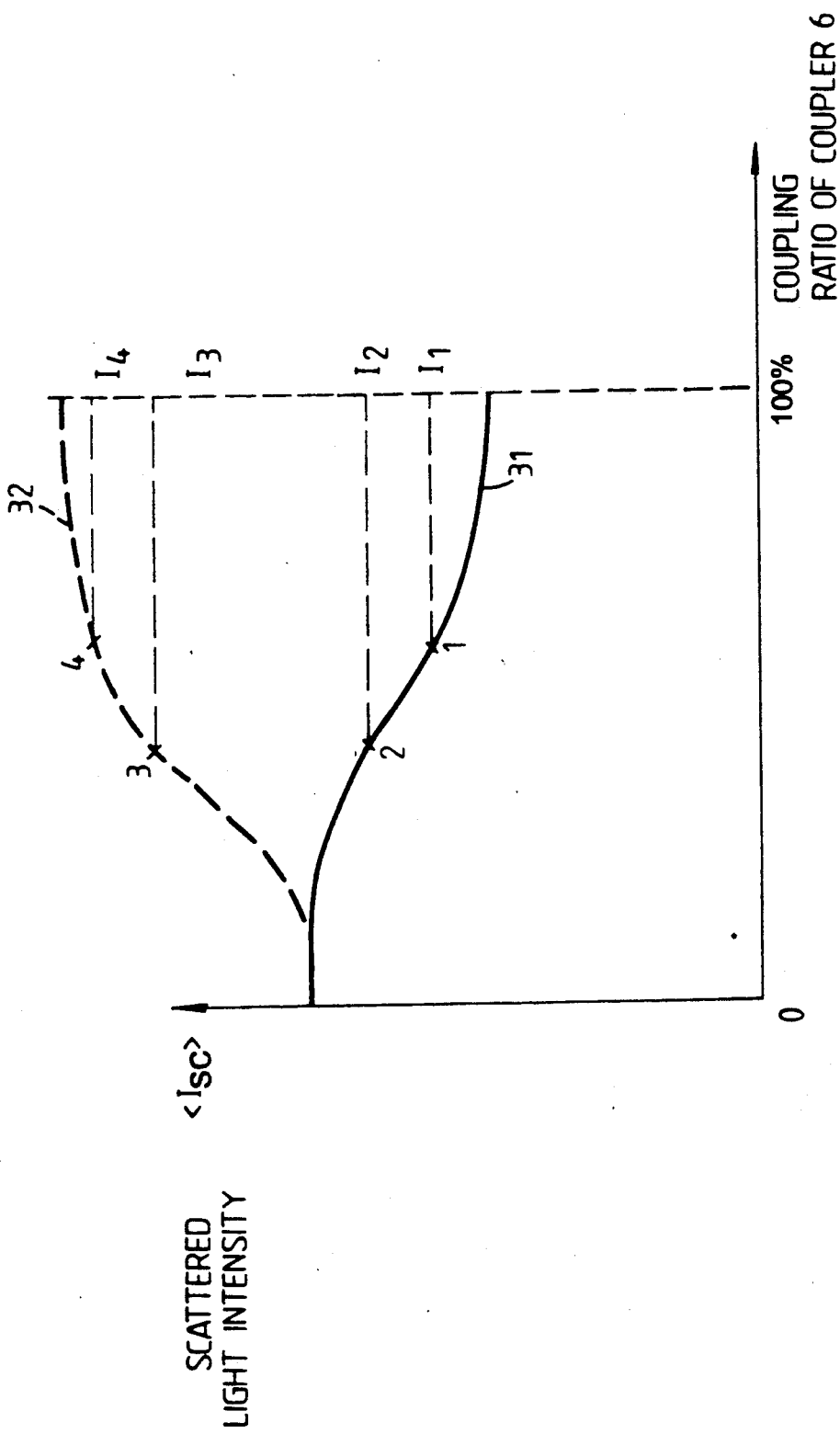
FIG. 3 is a graph showing scattered light intensity as a function of the coupling ratio of the first optical coupler.

If there is a difference in the intensities of the clockwise and counter-clockwise beams, then a gyro bias due to the Kerr effect will be induced as a result of the difference in intensity of the beams causing them to travel in material having different refractive indices and hence causing them to have an apparently different path length. The intensity of light scattered from the ring resonator will depend upon the intensities of the two beams. FIG. 3 is a graph of the intensity of scattered light as a function of the coupling ratio of the first optical coupler 6, curve 31. When the coupling ratio is zero, then all of the light is reflected and travels along waveguide 61. As the coupling ratio is increased then a greater proportion of light is transmitted via waveguide 62 until a value of coupling ratio is reached when all of the light is transmitted and all travels through waveguide 62. In the gyro in accordance with this invention the slope of the curve 31 is sampled by applying an alternating voltage as shown in FIG. 4a to the first optical coupler 6 to cause its coupling ratio to vary periodically. This variable and controlled voltage changes the coupling ratio of the coupler 6. Also an alternating voltage is applied to coupler 9. To go from curve 31 to 32 in FIG. 3 the voltage on coupler 9 goes from HIGH to LOW. When the voltage on coupler 9 is HIGH, the voltage on coupler 6 goes from HIGH to LOW giving intensities $I_1$ and $I_2$ respectively as the curve 31 is traced out. When the voltage in coupler 9 is LOW the curve 32 is traced out, and when the voltage on coupler 6 goes from LOW to HIGH the intensity goes from $I_3$ to $I_4$. Curve 32 is an inverted version of curve 31. Thus the intensity of the third reflected beam is varied in such a way that its value oscillates between two values the average of which is the value of the intensity of the second reflected beam.

The value of the voltage applied to coupler 9 is adjusted by a servo control in which the gain of the servo is sufficient to ensure that a degree of accuracy of substantially one part in $10^5$ is obtained in the generation of the values of points 3 and 4 on curve 32. The scattered light intensity acts as a control signal for the servo by providing an error signal. The error signal $I_{err}$ for the servo is given by:

$$I_{err} = (I_1 - I_2) - (I_3 - I_4)$$

To maintain a correct voltage on the third optical coupler 9, the servo control ensures that $I_{err}$ is equal to zero and thus, every time the voltage changes, this has the effect of reversing the Kerr effect induced gyro bias. When the gyro has an angular rotation detection circuit having a sampling period of 1/100 second, the first 6 and third 9 optical coupler are set to have a time period which is an integral fraction of this sampling period so that the time averaged intensity of the third reflected beam is equal to the intensity of the second reflected beam. Typically the sampling period and time period are both derived from the same clock.

I claim:

1. A ring resonator gyro including:
   a laser having a light output;
   a ring resonator;
   one light input for said ring resonator arranged whereby light entering said one input travels around said ring resonator in one sense;
   another light input of said ring resonator arranged whereby light entering said other input travels around said ring resonator in another sense;
   a first optical coupler having a variable coupling ratio, said first optical coupler being operatively coupled to said laser to receive said light output from said laser and divide said light into a first and a second component, said first and second component having a generally equal intensity;
   a second optical coupler, said second optical coupler being operatively coupled to said first optical coupler to receive said first component and transmit a predetermined proportion of said first component to said one input of said ring resonator for transmission around said ring resonator in said one sense;
   a third optical coupler having a variable coupling ratio, said third optical coupler being operatively connected to said first optical coupler to receive said second component and transmit a variable proportion of said second component to said other input of said ring resonator for transmission around said ring resonator in said opposite sense;
   a detector operatively coupled to said ring resonator for sensing the intensity of light scattered from said ring resonator and providing an output representative of said scattered light intensity;
   first varying means operatively connected to said first optical coupler to periodically vary said coupling ratio of said first optical coupler;
   sensing means responsive to said output of said detector as said first varying means varies said coupling ratio of said first coupler to sense a difference in intensity between said first and second components travelling around said ring resonator; and,
   second varying means operatively connected to said third optical coupler to vary said coupling ratio of said third optical coupler and thus the intensity of the proportion of said second component transmitted around said ring resonator during alternate periods whereby the time averaged intensity of both said first and second components transmitted around said ring resonator are equal.

2. A ring resonator gyro according to claim 1, wherein said coupling ratio of said third optical coupler is varied whereby said proportion of said second component transmitted around said ring resonator varies between a HIGH and LOW value at said same frequency as that of said first coupler.

3. A ring resonator gyro according to claim 2, wherein said HIGH and LOW values have an equal duration, and wherein said HIGH value of said second component corresponds to the sum of said LOW value plus twice the difference between the intensity of said first component transmitted around the ring resonator and said LOW value of said second component transmitted around said ring the magnitude of said intensity of said second component oscillates about and is centred on that of said first component.

4. A ring resonator gyro according to claim 2, wherein said first and second varying means are separated in phase by a phase difference of $\pi/2$ whereby said sensing means senses in turn:
   (a) the intensity of light scattered from said first component resulting from one coupling ratio of said first coupler and a LOW value of said second component;
   (b) the intensity of light scattered from said first component resulting from another coupling ratio of said first coupler and said LOW value of said second component;
   (c) the intensity of light scattered from said first component resulting from said other coupling ratio of said first coupler and a HIGH value of said second component; and,
   (d) the intensity of light scattered from said first component resulting from said one coupling ratio of said first coupler and said HIGH value of said second component.

5. A ring resonator gyro according to claim 4, wherein said sensing means derives differences between sensed values of (a) and (b) and between sensed values of (c) and (d) and varies said coupling ratio of said third optical coupler to make said two differences equal.

6. A ring resonator gyro according to claim 3, wherein said first and second varying means are separated in phase by a phase difference of $\pi/2$ whereby said sensing means senses in turn:
   (a) the intensity of light scattered from said first component resulting from one coupling ratio of said first coupler and a LOW value of said second component;
   (b) the intensity of light scattered from said first component resulting from another coupling ratio of said first coupler and said LOW value of said second component;
   (c) the intensity of light scattered from said first component resulting from said other coupling ratio of said first coupler and a HIGH value of said second component; and, (d) the intensity of light scattered from said first component resulting from said one coupling ratio of said first coupler and said HIGH value of said second component.

7. A ring resonator gyro according to claim 6, wherein said sensing means derives differences between sensed values of (a) and (b) and between sensed values of (c) and (d) and varies said coupling ratio of said third optical coupler to make said two differences equal.

8. A ring resonator gyro according to claim 1, wherein said second optical coupler has a coupling ratio whereby said predetermined proportion of said first component for transmission to said one input of said ring resonator is substantially one half of that output by said first optical coupler.

9. A ring resonator gyro according to claim 5, wherein said second optical coupler has a coupling ratio whereby said predetermined proportion of said first component for transmission to said one input of said ring resonator is substantially one half of that output by said first optical coupler.

10. A ring resonator gyro according to claim 7, wherein said second optical coupler has a coupling ratio whereby said predetermined proportion of said first component for transmission to said one input of said ring resonator is substantially one half of that output by said first optical coupler.

11. A ring resonator gyro according to claim 1, wherein said third optical coupler has a variable coupling ratio which is variable such that said proportion of said second component for transmission to said other input of said ring resonator is variable between 0 and 100% of that output by said first optical coupler.

12. A ring resonator gyro according to claim 5, wherein said third optical coupler has a variable coupling ratio which is variable such that said proportion of said second component for transmission to said other input of said ring resonator is variable between 0 and 100% of that output by said first optical coupler.

13. A ring resonator gyro according to claim 10, wherein said third optical coupler has a variable coupling ratio which is variable such that said proportion of said second component for transmission to said other input of said ring resonator is variable between 0 and 100% of that output by said first optical coupler.

14. A ring resonator gyro according to claim 1, wherein said gyro includes frequency shift means operatively coupled between said first optical coupler and said second and third optical couplers to shift the frequency of the laser light travelling in said opposite senses around said ring resonator, said frequency shift means being controlled to shift said frequency of said light whereby that travelling in both senses around said ring resonator is in resonance.

15. A ring resonator gyro according to claim 5, wherein said gyro includes frequency shift means operatively coupled between said first optical coupler and said second and third optical couplers to shift the frequency of the laser light travelling in said opposite senses around said ring resonator, said frequency shift means being controlled to shift said frequency of said light whereby that travelling in both senses around said ring resonator is in resonance.

16. A ring resonator gyro according to claim 13, wherein said gyro includes frequency shift means operatively coupled between said first optical coupler and said second and third optical couplers to shift the frequency of the laser light travelling in said opposite senses around said ring resonator, said frequency shift means being controlled to shift said frequency of said light whereby that travelling in both senses around said ring resonator is in resonance.

17. A ring resonator gyro according to claim 14, wherein said control signal applied to said frequency shifting means is monitored to provide an indication of any angular rotation of said ring resonator.

18. A ring resonator gyro according to claim 15, wherein said control signal applied to said frequency shifting means is monitored to provide an indication of any angular rotation of said ring resonator.

19. A ring resonator gyro according to claim 16, wherein said control signal applied to said frequency shifting means is monitored to provide an indication of any angular rotation of said ring resonator.

* * * * *